Oct. 1, 1929. G. A. VON HAGEL 1,729,694
CLAMP
Filed Oct. 20, 1927
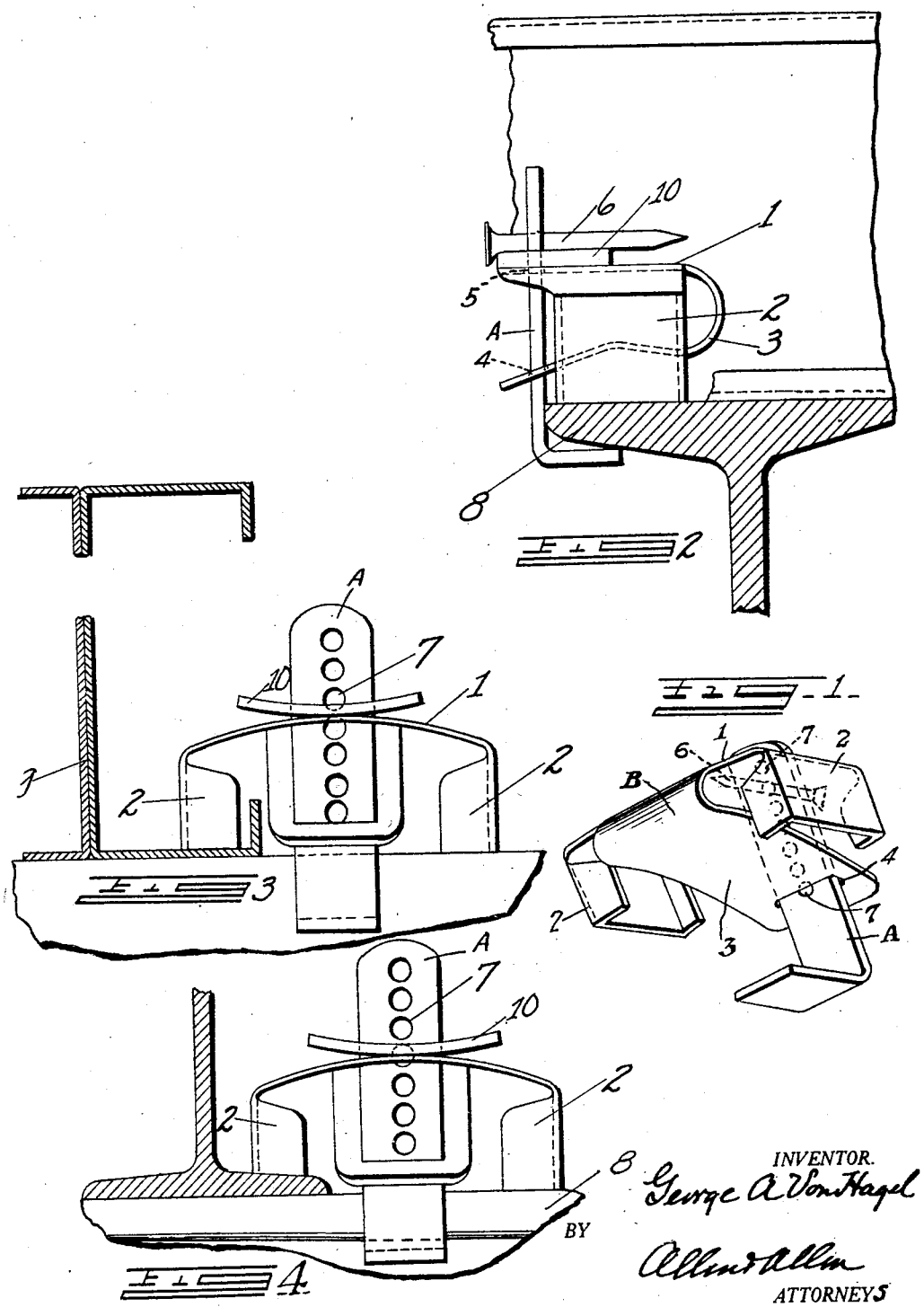

Patented Oct. 1, 1929

1,729,694

UNITED STATES PATENT OFFICE

GEORGE A. VON HAGEL, OF CINCINNATI, OHIO

CLAMP

Application filed October 20, 1927. Serial No. 227,547.

My invention has special relation to clips for securing metallic joists to I-beams in building constructions, and its object is to furnish a clip that can be readily and easily attached, and which will effectively secure the steel joist in place on the steel truss for the varying sizes of beams and much more expeditiously than with the devices now in use and with a very great saving in time and labor.

The clip consists of that certain novel construction and arrangement of parts as will be hereinafter more particularly pointed out and claimed.

In the drawings:—

Figure 1 is a perspective view of the complete clip with the clip shown in the reverse position to that shown in the other figures for purposes of clearness.

Figure 2 is a partial section of an I-beam with a steel joist mounted therein and a side elevation of the clip in place.

Figure 3 is a similar view taken at right angles to Figure 2.

Figure 4 is a similar view to that shown in Figure 3 for use with a modified form of joist.

The clip is made up of two parts; an L-shaped angle piece A preferably constructed of heavy metal and a clip piece B preferably of resilient sheet metal. The clip piece is stamped out of a sheet metal blank and bent to form a flat, slightly concave upper portion 1 with side portions bent downwardly and inwardly to form legs 2, 2, and a tongue portion 3 which is bent downwardly and inwardly. The tongue portion 3 is provided with an opening 4 and the concave top portion with an opening 5 which register and are cut at the same time that the blank is formed. Through these openings 4 and 5 the vertical portion of the L-shaped piece is passed and a nail 6 is inserted through one of the series of holes 7 to hold the parts together.

To secure the joist in place the operator takes a clip and adjusts the L-shaped end of the part A under the flange 8 of the I-beam with one leg of the sheet metal portion B over the base of the steel joist 9 and the other leg bearing on the top surface of the I-beam. Then with any convenient tool such as a lever with a transverse pin at the end the pin is inserted in one of the holes and the lever pressed down against the slightly concave or bowed surface of the sheet metal portion B which forces a tight gripping action between the legs 2, 2, and the L-shaped portion to clamp the two beams together.

The tongue 3 through which the vertical portion of clip A passes serves as a guide and prevents the clip from tipping when pressure is applied. The operator then passes a nail through the hole exposed by the compression of top of the sheet metal portion and the two parts are securely clamped together, in which connection I prefer to use a stiffening washer 10 underneath the nail.

With this construction of clip the workman can secure the steel joist to the truss beams quickly and easily at great saving of time and labor over the methods now in use.

The length of the L-shaped member and the number of holes in series permits the use of the clips on various sizes of beams without the need of clips of different sizes and the clip can be used with any construction of truss or joist. With the ordinary T beam it will be understood that two of the clips are used, one on each side of the T beam. The legs 2, 2, are preferably provided with side flanges as shown to give strength to the legs, and to prevent bending under pressure.

Having thus described my invention, what I claim as new and desire to secure by Letters Patent, is:—

1. A clip for fastening metallic joists to girders, comprising a spring plate having openings and with its ends bent downwardly to form a clamp member to engage the joist and girder, and a second clamp member bent to engage the beam and inserted through the openings in the spring plate, with means to hold the spring plate in compressed position.

2. A clip for fastening metallic joists to girders, comprising a spring plate having openings and with its ends bent downwardly to form a clamp member to engage the joist and girder, and a second clamp member bent to engage the beam inserted through the openings in the spring plate, the second clamp member provided with means to hold the spring plate in compressed position.

3. A clip for fastening metallic joists to girders, comprising a spring plate having openings and with its ends bent downwardly to form a clamp member to engage the joist and girder, and a second clamp member bent to engage the beam inserted through the openings in the spring plate, the second clamp member provided with a series of openings with a holding device co-operating therewith to hold the spring plate in compressed position.

4. A clip for fastening metallic joists to girders, comprising a spring plate having openings and with its ends bent downwardly to form a clamp member to engage the joist and girder, and a second clamp member bent to engage the beam inserted through the openings in the spring plate, the second clamp member provided with a series of vertical openings, and a nail inserted in the openings to hold the spring plate in compressed position.

5. In a device of the class described, a comparatively rigid L-shaped member, and a plate member with its ends bent to form downwardly extending clamp members, the horizontal portion of the L-shaped member serving as one member of the clamp with the vertical portion of the L-shaped member passing through the plate and provided with a series of holes for reception of means to hold the clamp members under compression.

6. A clip for fastening metallic joists to girders, comprising a spring plate with its ends bent downwardly to form a clamp member to engage the joist and girder, and a second clamp member bent to engage the beam inserted through the spring plate, with means to hold the spring plate in compressed position, with a tongue on the plate engaging the L-shaped member to prevent tipping.

7. In a device of the class described, a comparatively rigid L-shaped member and a resilient concave sheet metal member, with its ends bent to form downwardly extending clamp members, and its middle portion provided with a downwardly rearwardly curved tongue, with openings in the tongue and concave plate through which the vertical portion of the L-shaped rigid member passes, said vertical portion provided with a series of openings for the reception of a nail to hold the concave plate under compression.

GEORGE A. VON HAGEL.